(12) United States Patent
Cole

(10) Patent No.: US 8,993,966 B2
(45) Date of Patent: Mar. 31, 2015

(54) FLAME SENSOR INTEGRITY MONITORING

(71) Applicant: Barrett E. Cole, Bloomington, MN (US)

(72) Inventor: Barrett E. Cole, Bloomington, MN (US)

(73) Assignee: Honeywell International Inc., Morristown, NJ (US)

( * ) Notice: Subject to any disclaimer, the term of this patent is extended or adjusted under 35 U.S.C. 154(b) by 265 days.

(21) Appl. No.: 13/627,718

(22) Filed: Sep. 26, 2012

(65) Prior Publication Data

US 2014/0084166 A1 Mar. 27, 2014

(51) Int. Cl.
| | | |
|---|---|---|
| *G01J 5/02* | (2006.01) | |
| *G01J 1/02* | (2006.01) | |
| *G01J 1/08* | (2006.01) | |
| *G01J 1/42* | (2006.01) | |
| *G01J 5/60* | (2006.01) | |
| *G01J 5/00* | (2006.01) | |

(52) U.S. Cl.
CPC .................. *G01J 1/0228* (2013.01); *G01J 1/08* (2013.01); *G01J 1/4228* (2013.01); *G01J 5/026* (2013.01); *G01J 5/60* (2013.01); *G01J 2005/0048* (2013.01); *G01J 2005/0077* (2013.01)
USPC ........................................................ 250/342

(58) Field of Classification Search
CPC ....... G01J 5/10; G08B 25/002; G08B 29/145; G08B 17/00
USPC ....................................................... 250/342
See application file for complete search history.

(56) References Cited

U.S. PATENT DOCUMENTS

| | | | | |
|---|---|---|---|---|
| 3,580,680 | A * | 5/1971 | Crider | 356/315 |
| 4,317,045 | A * | 2/1982 | Coe et al. | 250/554 |
| 5,670,784 | A * | 9/1997 | Cusack et al. | 250/372 |
| 6,064,064 | A * | 5/2000 | Castleman | 250/339.15 |
| 6,078,050 | A * | 6/2000 | Castleman | 250/339.15 |
| 6,239,433 | B1 * | 5/2001 | Porter | 250/338.3 |
| 6,239,435 | B1 * | 5/2001 | Castleman | 250/339.15 |
| 6,422,745 | B1 * | 7/2002 | Glasheen et al. | 374/131 |
| 6,518,574 | B1 * | 2/2003 | Castleman | 250/339.15 |
| 7,361,948 | B2 * | 4/2008 | Hirano et al. | 257/294 |
| 8,513,605 | B2 * | 8/2013 | Beratan | 250/338.4 |
| 2002/0011570 | A1 * | 1/2002 | Castleman | 250/339.15 |
| 2007/0262256 | A1 * | 11/2007 | Lee | 250/338.1 |
| 2010/0171190 | A1 * | 7/2010 | Liger | 257/428 |
| 2012/0281083 | A1 * | 11/2012 | Chivers et al. | 348/81 |
| 2013/0228692 | A1 * | 9/2013 | Larsen | 250/342 |

OTHER PUBLICATIONS

Riggan et al., "Field applications of a multi-spectral, thermal imaging radiometer," 1999, IEEE Aerospace Conference Proceedings, vol. 3, pp. 443-449.*

* cited by examiner

*Primary Examiner* — Kiho Kim
(74) *Attorney, Agent, or Firm* — Schwegman Lundberg & Woessner, P.A.

(57) ABSTRACT

A flame detector includes a medium wavelength infrared bolometer having an array of pixel elements disposed within a housing. Optics supported by the housing and disposed with respect to the bolometer direct infrared radiation from a flame to the pixel elements of the array and direct radiation from a separate background object to the pixel elements of the array. Electronics are coupled to receive signals from the bolometer and programmed to track an intensity of radiation from the background object to monitor transmission of radiation through the optics.

20 Claims, 3 Drawing Sheets

FLAME SENSOR INTEGRITY MONITORING

BACKGROUND

Most flame sensors must have a way to monitor the health of the optical system. Without this and if the window gets coated, a flame could occur and the sensor would be totally unaware. To overcome this problem some IR sensors have an integral light source. The internal light source is either inside a sensor housing or outside the sensor housing. Light from the internal light source is projected through optics to prove that the sensor is still imaging and that a lens or optics is not contaminated. The main purpose is to monitor degradation of transmission over an extended time (weeks, months) rather than any instant change. The use of such a light source can draw additional power, which may shorten sensor battery life. In addition, the intensity of the light source itself may vary over time, either from gradual failure or decrease in power, causing an error in monitoring the health of the optical system.

SUMMARY

A flame detector includes a medium wavelength infrared bolometer having an array of pixel elements disposed within a housing. Optics supported by the housing and disposed with respect to the bolometer direct infrared radiation from a flame to the pixel elements of the array and direct radiation from a separate background object to the pixel elements of the array. Electronics are coupled to receive signals from the bolometer and programmed to track an intensity of radiation from the background object to monitor transmission of radiation through the optics.

A method includes sensing radiation received through optics using a mid-wavelength infrared bolometer array of pixels with a portion of a field of view of the bolometer to sense a flame, sensing background radiation via the bolometer with a different portion of a field of view of the bolometer, and detecting a change of intensity of the sensed background radiation.

A computer readable storage device has instructions for causing a computer to execute a method. The method includes receiving data representing sensed radiation received through optics using a mid-wavelength infrared bolometer array of pixels with a portion of a field of view of the bolometer to sense a flame, receiving data representative of sensed background radiation via the bolometer with a different portion of a field of view of the bolometer, and calculating a change of intensity of the sensed background radiation.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

A medium wavelength infrared (MWIR) imaging flame sensor bolometer detects an image. Unlike triple IR detectors, it can discriminate between ifferent objects in the FOV. The triple IR is just a single detector that images the whole wide FOV onto a single element. A better solution that can be achieved with the Honeywell flame sensor is to use the imaging of a non-flame object of known brightness in the FOV to determine transmission loss of the optical element. One such object is to observe change in the brightness of the sun if it is the FOV at some part of the day. Another is to observe the change in the brightness in the MWIR band of the background of the local environment such as the ground. While this can change with temperature it is straight forward to make corrections for the MWIR black body radiation change by measuring the ground temperature on any day. A third method is to fix on an object that has a well defined temperature that will be in the FOV and measure changes in the radiance over time.

In one embodiment, an algorithm is modified to know where the source is in the field of view. Measurements of the intensity are made periodically, such as daily. When the intensity is sufficiently low, the optics can be changed out. In the meantime, any sensing function for flames can be scaled based on the changing transmission scale factor and the threshold for flames detection can be accordingly adjusted. This feature extends the life of the product and makes it more attractive to customers without the need for a complex internal radiation source.

Figure 1:
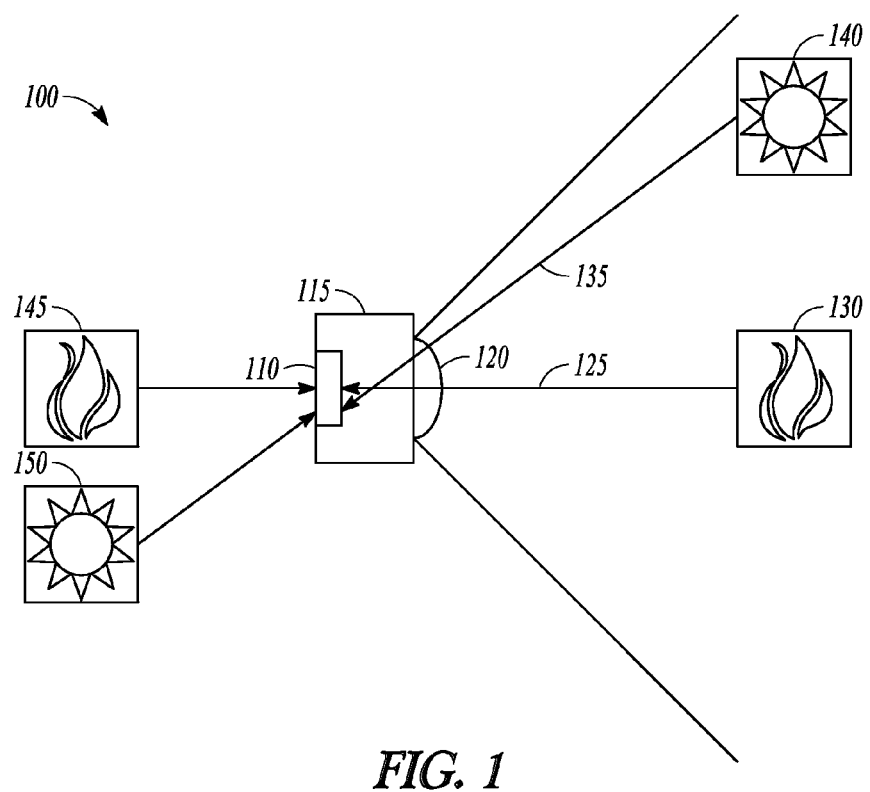
FIG. 1 is a block diagram of a bolometer showing a target and a background source of radiation according to an example embodiment.

FIG. 1 is a block diagram of a bolometer system 100. A bolometer array 110 is supported in a housing 115 that supports optics, such as a lens 120. The lens 120 operations to focus radiation on selected sets of pixel elements of the array 110. For instance, radiation 125 from an object 130 which may include a flame, is focused on a first portion of the array 110. An algorithm is used to determine whether or not the flame is present, or certain characteristics of the flame discernible from the wavelength of radiation detectable by the array 110.

Over time, the lens 120 can become dirty or worn, and transmit less radiation. To measure this degradation, radiation 135 from a background source 140, such as the sun, or a selected area such as the ground, which may include landscaping, the ground, trees, etc., is received on a portion of the array through the lens 120. A known intensity of the background radiation is used to determine a decrease in intensity that corresponds to the condition of the optics, such as lens 120. The decrease in intensity may be used to determine when to maintain the optics, such as cleaning or replacing a lens. The decrease in intensity may also be used by a flame detection algorithm to modify one or more thresholds to correctly detect the presence or condition of a flame. For instance, a 50% decrease in intensity may result in thresholds for detection be decreased a corresponding amount, or some other amount depending on the type of detection algorithm used.

Figure 2:
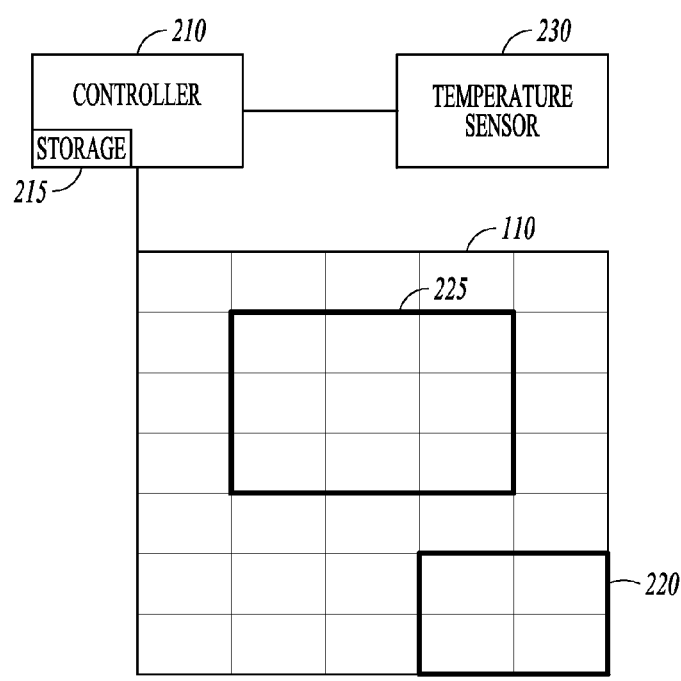
FIG. 2 is a block diagram illustrating further detail of the bolometer of FIG. 1 according to an example embodiment.

FIG. 2 is a block diagram illustrating further detail of an example system 200. A controller 210 is coupled to the array 110 to receive signals from the pixel elements of the array. A storage device 215, such as random access memory, contains software implementing a flame detection algorithm and an intensity analysis algorithm for determining the condition of the optics when executed by a processor in controller 210. In one embodiment, array 110 contains a first set of pixels indicated at dark polygon 220 on which the background radiation is sensed, and a second set of pixels indicated at dark polygon 225 on which radiation which may represent a flame is sensed. The controller is aware of these locations on the array and processes signals from each accordingly for flame and condition of optics. Polygon 220 may be initially identified at set up of the system, may be identified by sensing the location of a background object such as the sun and track that object throughout the seasons, or may be sensed and identified by the system as an object that appears to be a fairly constant radiation source after a selected time of operation. Many different methods may be used to select the background object to monitor. In some embodiments, it should be located a distance away from the flame to be detected such that it may be measured independent of the flame.

In still further embodiments, the position of where a flame may be detected could be anywhere in the field of view. In such cases, multiple background objects may be used to monitor the condition of the optics so that if a flame is continuous in the same position as one of the background objects, another background object, or an average of background objects with or without the flame obscured background object may be used. Some objects, like the sun, move. This would allow the same object to be used in different locations at different times of day to avoid the case of a stationary object that may be obscured or otherwise adversely affected by a flame occurring in the same spot as the stationary object.

In further embodiments, the location of the background object is in a position where no flame will occur. The measurement on an object of both known temperature and emissivity may be made whether or not the flame is present.

In one embodiment, a temperature sensor 230 may be used to assist in detecting the intensity of the background radiation, which may naturally vary based on ambient temperature. The temperatures sensor 230 may be inside or outside the housing of the system in various embodiments and may also represent a connection to an independent temperature sensor, such as a weather application running on the Internet, or stand-alone temperature sensor transmitting temperature data.

The temperature sensor may even be placed proximate or near the object of known emissivity with a display that shows the temperature in a known scale, such as degrees C. The image of the display with temperature may then be used to obtain the temperature of the object to further aid in determining the proper emissivity of the object as compared to the sensed emissivity as determined by the intensity level transmitted through the lens 120. In one embodiment, the temperature sensor is placed close enough to the object such that the measured temperature is representative of the temperature of the object and hence emissivity of the object. In one embodiment, the object and temperature display are positioned where no flame will be detected. The visual indication may be obtained using the array of pixels if they are capable of such sensing, or a separate camera may be used to capture the image of the temperature display. The display may be numeric, or some other form, such as a bar code, QR code, or other form of communication.

Figure 3:
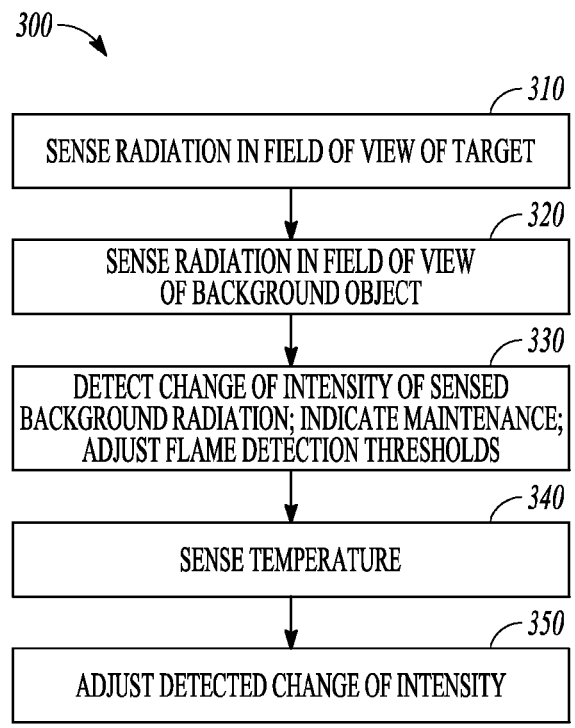
FIG. 3 is a flowchart illustrating a method of monitoring optics of a bolometer according to an example embodiment.

FIG. 3 is a flowchart illustrating a method 300 of monitoring optics of a bolometer. Method 300 includes at 310, sensing radiation received through optics using a mid-wavelength infrared bolometer array of pixels with a portion of a field of view of the bolometer to sense a flame. At 320, background radiation is sensed via the bolometer with a different portion of a field of view of the bolometer. At 330, a change of intensity of the sensed background radiation is detected.

In further embodiments, an indication when maintenance should be performed the optics associated with the bolometer due to a decrease in radiation transmission through the optics. In still further embodiments, a threshold for identifying a flame is changed based on the detected change of intensity.

In still further embodiments, method 300 includes sensing an ambient temperature at 340 and using the sensed ambient temperature to adjust the detected change of intensity of the sensed background radiation at 350.

The sensed background radiation may be radiation from the Sun at a selected time of day. The change of intensity may then be detected over many days, allowing for differences caused by atmospheric conditions and other events than can be averaged and excluded based on statistical measures. In yet a further embodiment, the sensed background radiation comprises mid wavelength infrared radiation from the ground.

Figure 4:
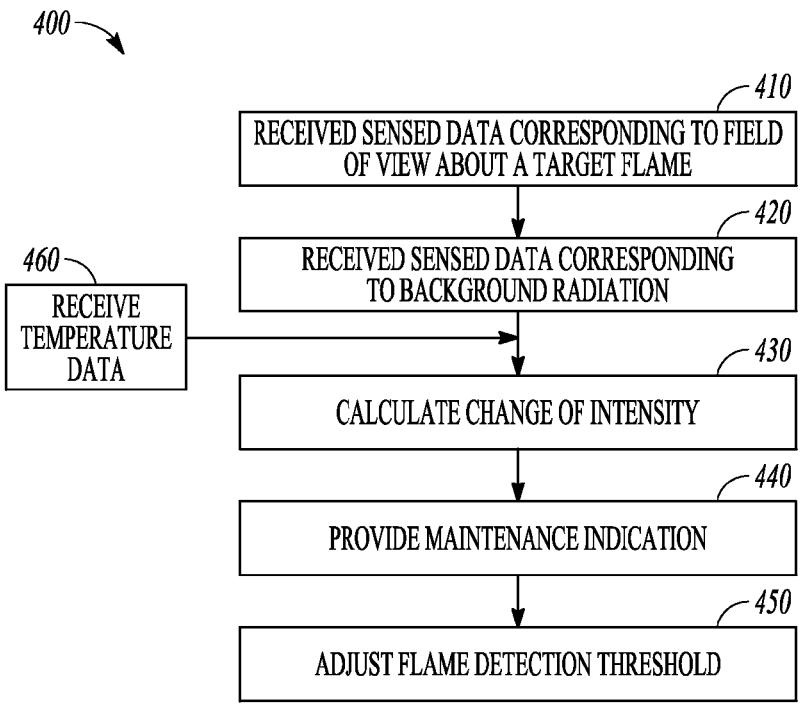
FIG. 4 is a flowchart illustrating a method of processing sensed data to determine intensity changes due to degraded optics performance according to an example embodiment.

FIG. 4 is a flowchart illustrating a method 400 of processing sensed data to determine intensity changes due to degraded optics performance. The method may be incorporated into a computer readable storage device having instructions for causing a computer to execute the method. At 410 the method receives data representing sensed radiation received through optics using a mid-wavelength infrared bolometer array of pixels with a portion of a field of view of the bolometer to sense a flame. At 420, data is received that is representative of sensed background radiation via the bolometer with a different portion of a field of view of the bolometer. At 430, a change of intensity of the sensed background radiation is calculated.

The method may further include providing an indication 440 when maintenance should be performed the optics associated with the bolometer due to a decrease in radiation transmission through the optics. In still further embodiments, the method further includes at 450, adjusting a threshold for identifying a flame based on the detected change of intensity. In one embodiment, the method receives data representative of sensed ambient temperature at 460, and uses the sensed ambient temperature to adjust the detected change of intensity of the sensed background radiation at 430. The change of intensity of sensed background radiation may be used to scale a threshold for flame detection at 450.

Figure 5:
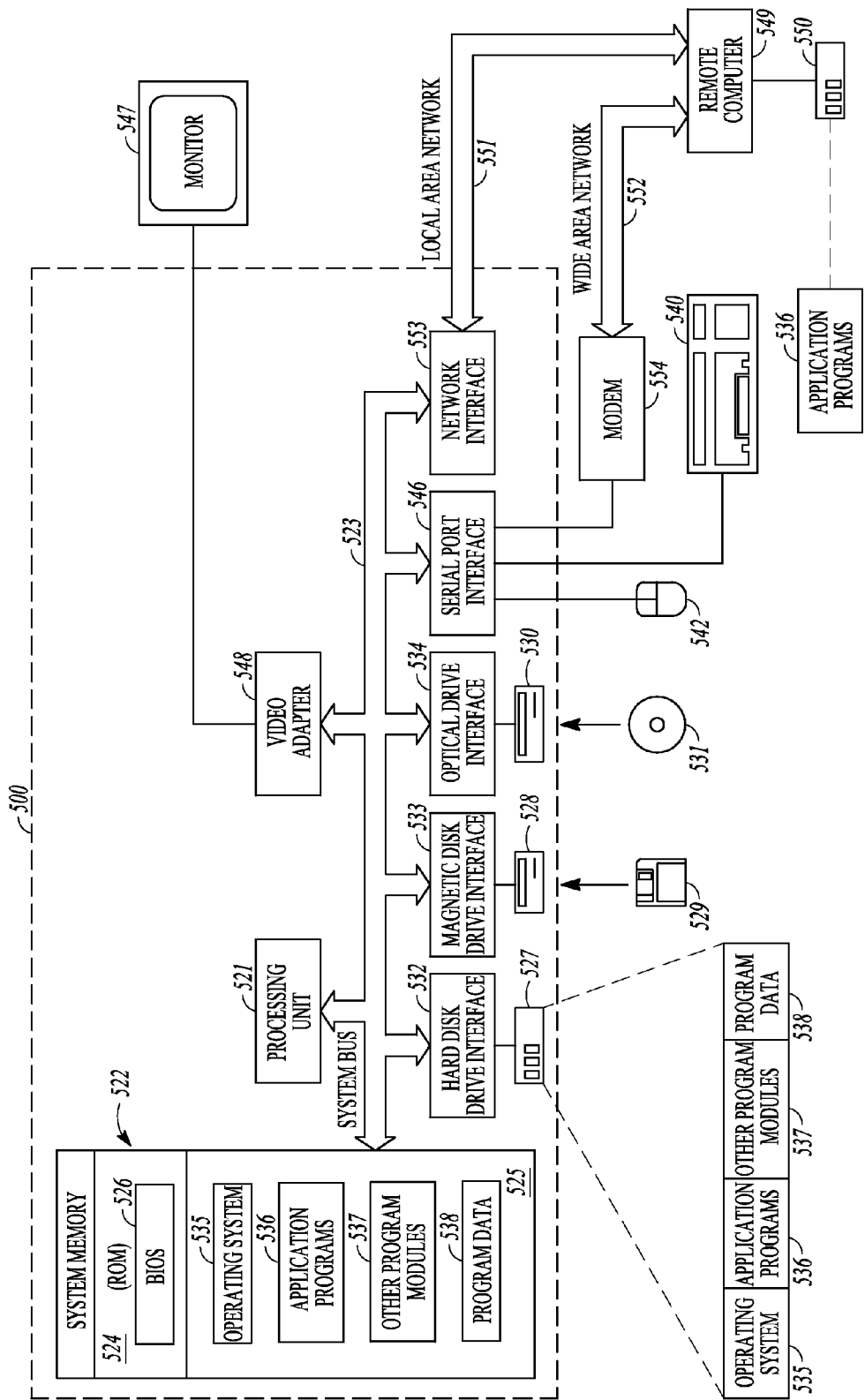
FIG. 5 is a block architecture diagram of an example computer for performing methods and controlling the bolometer according to an example embodiment.

FIG. 5 is a block diagram of a computer system to implement methods according to an example embodiment and to implement controller 210. In the embodiment shown in FIG. 5, a hardware and operating environment is provided that is applicable to the controller 210 with many of the components omitted for simplicity and lower cost. For instance, the controller 210 may be formed of a simple processor and memory with ports for receiving and providing data, along with a scaled down operating system. Many of the other components are optional.

As shown in FIG. 5, one embodiment of the hardware and operating environment includes a general purpose computing device in the form of a computer 500 (e.g., a personal computer, workstation, or server), including one or more processing units 521, a system memory 522, and a system bus 523 that operatively couples various system components including the system memory 522 to the processing unit 521. There may be only one or there may be more than one processing unit 521, such that the processor of computer 500 comprises a single central-processing unit (CPU), or a plurality of processing units, commonly referred to as a multiprocessor or parallel-processor environment. In various embodiments, computer 500 is a conventional computer, a distributed computer, or any other type of computer.

The system bus 523 can be any of several types of bus structures including a memory bus or memory controller, a peripheral bus, and a local bus using any of a variety of bus architectures. The system memory can also be referred to as simply the memory, and, in some embodiments, includes read-only memory (ROM) 524 and random-access memory (RAM) 525. A basic input/output system (BIOS) program 526, containing the basic routines that help to transfer information between elements within the computer 500, such as during start-up, may be stored in ROM 524. The computer 500 further includes a hard disk drive 527 for reading from and writing to a hard disk, not shown, a magnetic disk drive 528 for reading from or writing to a removable magnetic disk 529, and an optical disk drive 530 for reading from or writing to a removable optical disk 531 such as a CD ROM or other optical media.

The hard disk drive 527, magnetic disk drive 528, and optical disk drive 530 couple with a hard disk drive interface 532, a magnetic disk drive interface 533, and an optical disk drive interface 534, respectively. The drives and their associated computer-readable media provide non volatile storage of computer-readable instructions, data structures, program modules and other data for the computer 500. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the example operating environment.

A plurality of program modules can be stored on the hard disk, magnetic disk 529, optical disk 531, ROM 524, or RAM 525, including an operating system 535, one or more application programs 536, other program modules 537, and program data 538. Programming for implementing one or more processes or method described herein may be resident on any one or number of these computer-readable media.

A user may enter commands and information into computer 500 through input devices such as a keyboard 540 and pointing device 542. Other input devices (not shown) can include a microphone, joystick, game pad, satellite dish, scanner, or the like. These other input devices are often connected to the processing unit 521 through a serial port interface 546 that is coupled to the system bus 523, but can be connected by other interfaces, such as a parallel port, game port, or a universal serial bus (USB). A monitor 547 or other type of display device can also be connected to the system bus 523 via an interface, such as a video adapter 548. The monitor 547 can display a graphical user interface for the user. In addition to the monitor 547, computers typically include other peripheral output devices (not shown), such as speakers and printers.

The computer 500 may operate in a networked environment using logical connections to one or more remote computers or servers, such as remote computer 549. These logical connections are achieved by a communication device coupled to or a part of the computer 500; the invention is not limited to a particular type of communications device. The remote computer 549 can be another computer, a server, a router, a network PC, a client, a peer device or other common network node, and typically includes many or all of the elements described above I/O relative to the computer 500, although only a memory storage device 550 has been illustrated. The logical connections depicted in FIG. 5 include a local area network (LAN) 551 and/or a wide area network (WAN) 552. Such networking environments are commonplace in office networks, enterprise-wide computer networks, intranets and the internet, which are all types of networks.

When used in a LAN-networking environment, the computer 500 is connected to the LAN 551 through a network interface or adapter 553, which is one type of communications device. In some embodiments, when used in a WAN-networking environment, the computer 500 typically includes a modem 554 (another type of communications device) or any other type of communications device, e.g., a wireless transceiver, for establishing communications over the wide-area network 552, such as the internet. The modem 554, which may be internal or external, is connected to the system bus 523 via the serial port interface 546. In a networked environment, program modules depicted relative to the computer 500 can be stored in the remote memory storage device 550 of remote computer, or server 549. It is appreciated that the network connections shown are for example only, and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

EXAMPLES

1. A flame detector comprising:
a medium wavelength infrared bolometer having an array of pixel elements disposed within a housing;
optics supported by the housing and disposed with respect to the bolometer to direct infrared radiation from a flame to the pixel elements of the array and to direct radiation from a separate background object to the pixel elements of the array; and
electronics coupled to receive signals from the bolometer and programmed to track an intensity of radiation from the background object to monitor transmission of radiation through the optics.

2. The flame detector of example 1 wherein the bolometer detects radiation from the background object comprising the sun at a selected part of a day.

3. The flame detector of any of examples 1-2 wherein the bolometer detects radiation from the background object comprising a non-flame object of known brightness in a set of pixel elements separate from pixel elements receiving radiation from the flame.

4. The flame detector of any of examples 1-3 wherein the bolometer detects radiation from the background object comprising medium wavelength infrared radiation from a background environment within a field of view of the bolometer.

5. The flame detector of example 4 wherein pixel elements receiving radiation from the ground are used to monitor transmission of radiation through the optics.

6. The flame detector of any of examples 1-5 and further comprising a temperature sensor coupled to provide a sensed ambient temperature proximate the housing to the electronics.

7. The flame detector of example 6 wherein the electronics is adapted to compensate for temperature while monitoring transmission of radiation through the optics, and wherein the temperature sensor is proximate the background object and provides a visual indication of the temperature proximate the background object, and wherein the electronics is adapted to obtain an image of the visual indication to obtain the temperature.

8. The flame detector of any of examples 1-7 wherein the electronics uses the tracked intensity of radiation from the background object to scale a threshold for flame detection.

9. The flame detector of any of examples 1-8 wherein the electronics is adapted to provide an indication regarding optics maintenance when the intensity of transmission through the optics is below a specified threshold.

10. A method comprising:
sensing radiation received through optics using a mid-wavelength infrared bolometer array of pixels with a portion of a field of view of the bolometer to sense a flame;
sensing background radiation via the bolometer within the field of view of the bolometer; and
detecting a change of intensity of the sensed background radiation.

11. The method of example 10 and further comprising providing an indication when maintenance should be performed the optics associated with the bolometer due to a decrease in radiation transmission through the optics.

12. The method of any of examples 10-11 and further comprising adjusting a threshold for identifying a flame based on the detected change of intensity.

13. The method of any of examples 10-12 and further comprising:
sensing an ambient temperature; and
using the sensed ambient temperature to adjust the detected change of intensity of the sensed background radiation.

14. The method of any of examples 10-13 wherein the sensed background radiation comprises radiation from the Sun at a selected time of day.

15. The method of example 14 wherein the change of intensity is detected over many days.

16. The method of any of examples 10-15 wherein the sensed background radiation comprises mid wavelength infrared radiation from the ground.

17. A computer readable storage device having instructions for causing a computer to execute a method, the method comprising:
receiving data representing sensed radiation received through optics using a mid-wavelength infrared bolometer array of pixels with a portion of a field of view of the bolometer to sense a flame;
receiving data representative of sensed background radiation via the bolometer within the field of view of the bolometer; and
calculating a change of intensity of the sensed background radiation.

18. The computer readable storage device of example 17 wherein the method further comprises providing an indication when maintenance should be performed the optics associated with the bolometer due to a decrease in radiation transmission through the optics.

19. The computer readable storage device of any of examples 17-18 wherein the method further comprises adjusting a threshold for identifying a flame based on the detected change of intensity.

20. The computer readable storage device of any of examples 17-19 wherein the method further comprises:
receiving data representative of sensed ambient temperature;
using the sensed ambient temperature to adjust the detected change of intensity of the sensed background radiation; and
using the change of intensity of sensed background radiation to scale a threshold for flame detection.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A flame detector comprising:
a medium wavelength infrared bolometer having an array of pixel elements disposed within a housing;
optics supported by the housing and disposed with respect to the bolometer to direct infrared radiation from a flame to the pixel elements of the array and to direct radiation from a separate background object to the pixel elements of the array; and
electronics coupled to receive signals from the bolometer and programmed to track an intensity of radiation from the background object to monitor transmission of radiation through the optics.

2. The flame detector of claim 1 wherein the bolometer detects radiation from the background object comprising the sun at a selected part of a day.

3. The flame detector of claim 1 wherein the bolometer detects radiation from the background object comprising a non-flame object of known brightness in a set of pixel elements separate from pixel elements receiving radiation from the flame.

4. The flame detector of claim 1 wherein the bolometer detects radiation from the background object comprising medium wavelength infrared radiation from a background environment within a field of view of the bolometer.

5. The flame detector of claim 4 wherein pixel elements receiving radiation from the ground are used to monitor transmission of radiation through the optics.

6. The flame detector of claim 1 and further comprising a temperature sensor coupled to provide a sensed ambient temperature proximate the housing to the electronics.

7. The flame detector of claim 6 wherein the electronics is adapted to compensate for temperature while monitoring transmission of radiation through the optics, and wherein the temperature sensor is proximate the background object and provides a visual indication of the temperature proximate the background object, and wherein the electronics is adapted to obtain an image of the visual indication to obtain the temperature.

8. The flame detector of claim 1 wherein the electronics uses the tracked intensity of radiation from the background object to scale a threshold for flame detection.

9. The flame detector of claim 1 wherein the electronics is adapted to provide an indication regarding optics maintenance when the intensity of transmission through the optics is below a specified threshold.

10. A method comprising:
sensing radiation received through optics using a mid-wavelength infrared bolometer array of pixels with a portion of a field of view of the bolometer to sense a flame;
sensing background radiation via the bolometer within the field of view of the bolometer; and
detecting a change of intensity of the sensed background radiation.

11. The method of claim 10 and further comprising providing an indication when maintenance should be performed the optics associated with the bolometer due to a decrease in radiation transmission through the optics.

12. The method of claim 10 and further comprising adjusting a threshold for identifying a flame based on the detected change of intensity.

13. The method of claim 10 and further comprising:
sensing an ambient temperature; and
using the sensed ambient temperature to adjust the detected change of intensity of the sensed background radiation.

14. The method of claim 10 wherein the sensed background radiation comprises radiation from the Sun at a selected time of day.

15. The method of claim 14 wherein the change of intensity is detected over many days.

16. The method of claim 10 wherein the sensed background radiation comprises mid wavelength infrared radiation from the ground.

17. A non-transitory computer readable storage device having instructions for causing a computer to execute a method, the method comprising:
receiving data representing sensed radiation received through optics using a mid-wavelength infrared bolometer array of pixels with a portion of a field of view of the bolometer to sense a flame;
receiving data representative of sensed background radiation via the bolometer within the field of view of the bolometer; and
calculating a change of intensity of the sensed background radiation.

18. The non-transitory computer readable storage device of claim 17 wherein the method further comprises providing an indication when maintenance should be performed the optics associated with the bolometer due to a decrease in radiation transmission through the optics.

19. The non-transitory computer readable storage device of claim 17 wherein the method further comprises adjusting a threshold for identifying a flame based on the detected change of intensity.

20. The non-transitory computer readable storage device of claim 17 wherein the method further comprises:
receiving data representative of sensed ambient temperature;
using the sensed ambient temperature to adjust the detected change of intensity of the sensed background radiation; and
using the change of intensity of sensed background radiation to scale a threshold for flame detection.

* * * * *